United States Patent [19]

Rymarchyk et al.

[11] E Re. 28,769

[45] Reissued Apr. 13, 1976

[54] NOZZLE FOR FUEL AND OXYGEN LANCE ASSEMBLY

[75] Inventors: Nicholas M. Rymarchyk, Pittsburgh; Leo L. Meinert, Baden, both of Pa.

[73] Assignee: Berry Metal Company, Harmony, Pa.

[22] Filed: Dec. 9, 1974

[21] Appl. No.: 531,005

Related U.S. Patent Documents

Reissue of:

[64] Patent No.: 3,823,929
Issued: July 16, 1974
Appl. No.: 396,912
Filed: Sept. 13, 1973

[52] U.S. Cl. ..... 266/34 L; 239/132.3
[51] Int. Cl.[2] ..... F27D 23/00
[58] Field of Search ..... 239/132.3; 266/34 L, 41

[56] References Cited

FOREIGN PATENTS OR APPLICATIONS 1,070,049 5/1967 United Kingdom ..... 266/34 L

*Primary Examiner*—Gerald A. Dost

[57] ABSTRACT

A lance for directing oxygen and fuel oil to a basic oxygen furnace includes a central fuel pipe, an insulating pipe around said fuel pipe, an oxygen pipe and water coolant pipes, all concentrically disposed. The central fuel pipe and insulating pipe have closed bottom walls and a plurality of relatively narrow fuel tubes are connected to bores in the bottom wall of the fuel tube, extend through the bottom wall of the insulating pipe and extend into three converging-diverging orifices. The narrow fuel tubes are supported in cantilever fashion and are concentric with each orifice.

8 Claims, 6 Drawing Figures

27
28
32
33
35
34
29
32

19
18
29
11
16
17
37
30
36
26
31
21
20
14
15
25
81
24
80
13
46
41
46'
14
10
38
46'
42
50
40
40
45
43
39
47
44
48
49
52
24'
51
56
53
56
55
39'
54
57
58
60
59
60'
57'

28
27
32
29
18
16
83
82
17
20
21
16
15
24
36

NOZZLE FOR FUEL AND OXYGEN LANCE ASSEMBLY

Matter enclosed in heavy brackets [ ] appears in the original patent but forms no part of this reissue specification; matter printed in italics indicates the additions made by reissue.

CROSS-REFERENCE TO RELATED APPLICATION

Application Ser. No. 396,911 filed Sept. 13, 1973.

BACKGROUND OF THE INVENTION

1. Field of the Invention

This invention relates to the art of steel making equipment and more particularly to an improved oxygen-fuel injection lance for introducing oxygen and fuel gas simultaneously into an open hearth furnace or basic oxygen furnace with the intermixture of the oxygen and fuel anywhere in the lance except in the nozzle ejecting orifices.

2. Description of the Prior Art

The prior art is disclosed in the following patents:

| | | | |
|---|---|---|---|
| 2,991,173 | 7/4/61 | 75/52 | Trentini and Vayssiere |
| 3,076,642 | 2/5/63 | 266/41 | Dhenein |
| 3,313,535 | 4/11/67 | 266/34 | Hopkins |
| 3,342,473 | 9/19/67 | 266/41 | White |
| 3,556,497 | 1/19/71 | 266/34 | Grenfell |
| 3,608,881 | 9/28/71 | 266/41 | Yordanov et al. |
| 3,626,501 | 12/7/71 | 266/41 | Baird et al. |

SUMMARY OF THE INVENTION

The present lance includes five concentric pipes, with a central fuel pipe having a transverse first closure wall. An insulating pipe around said closure wall also includes a second transverse closure wall below said first wall. The lance end or nozzle is of the multiple type including three equally spaced orifices of convergent-divergent cylindrical wall construction. Three relatively narrow fuel tubes are secured to the first wall, communicate with the first or central fuel pipe and project through the second wall in cantilever relation. The narrow tubes are supported further by spacers within the orifices, the said spacers permitting the free flow of oxygen around the narrow tubes. The ends of the narrow tube terminate within the orifices where the gas and oxygen are intermixed and directed to the B.O.F. bath.

BRIEF DESCRIPTION OF THE PREFERRED EMBODIMENT

Figures 1, 6:
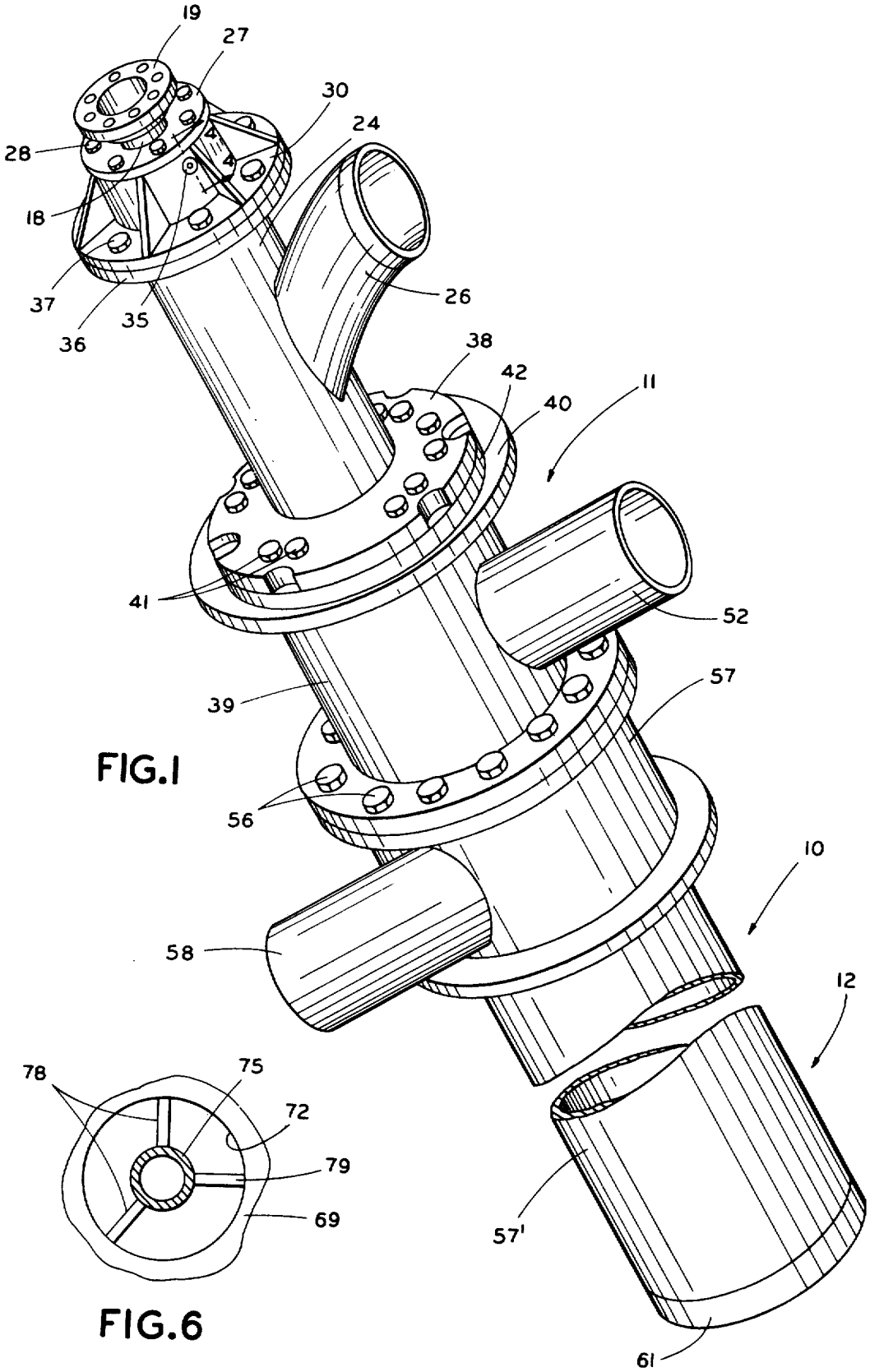
FIG. 1 is a perspective view disclosing one embodiment of the gas injection lance of this invention.
FIG. 6 is a cross sectional view taken substantially along the line 6—6 of FIG. 3.

Referring to the drawings, an oxygen fuel lance assembly is designated at 10 and includes a top assembly 11 and a lower nozzle or lance tip designated at 12. The lance assembly 10 comprises a first inner pipe 13 which is utilized for the flow of fuel oil, or similar type of fuel, adapted to effectively mix with the oxygen at the nozzle end and to be directed therewith to the interior of a basic oxygen furnace to provide for the refining of steel. The basic oxygen process is well known to those skilled in the art and the physical and organic reactions occurring in the steel and bath assembly as a result of the oxygen and fuel flow need not be described in detail since the present invention is primarily detailed to the construction of the lance assembly.

The first inner pipe 13 which extends substantially the full length of the lance is surrounded and concentric with a second insulating pipe 14 which provides therebetween an insulataing space 15. As disclosed in FIG. 2, the upper end of the pipe 13 is provided with an enlargement and which has integral therewith an enlarged sleeve 16 of piston-like configuration. The enlarged piston type sleeve is provided with a plurality of sealing rings 17. The sealing rings 17 may be of any suitable conventional construction and O-type sealing rings are effective for this purpose. A stub pipe 18 is in mating relation with respect to the sleeve 16 and is provided at its upper end with an adaptor connection 19 which may be suitably connected to a source of fuel oil. The lower end of the stub pipe 18 is provided with a piston sleeve portion 20, also including a plurality of sealing rings 21. The second insulating pipe 14 is also similarly provided with an enlarged piston sleeve 22 at its upper end which projects upwardly beyond the sleeve 16. The piston sleeve 22 is also provided with a plurality of seals 23.

Figures 2, 4, 5:
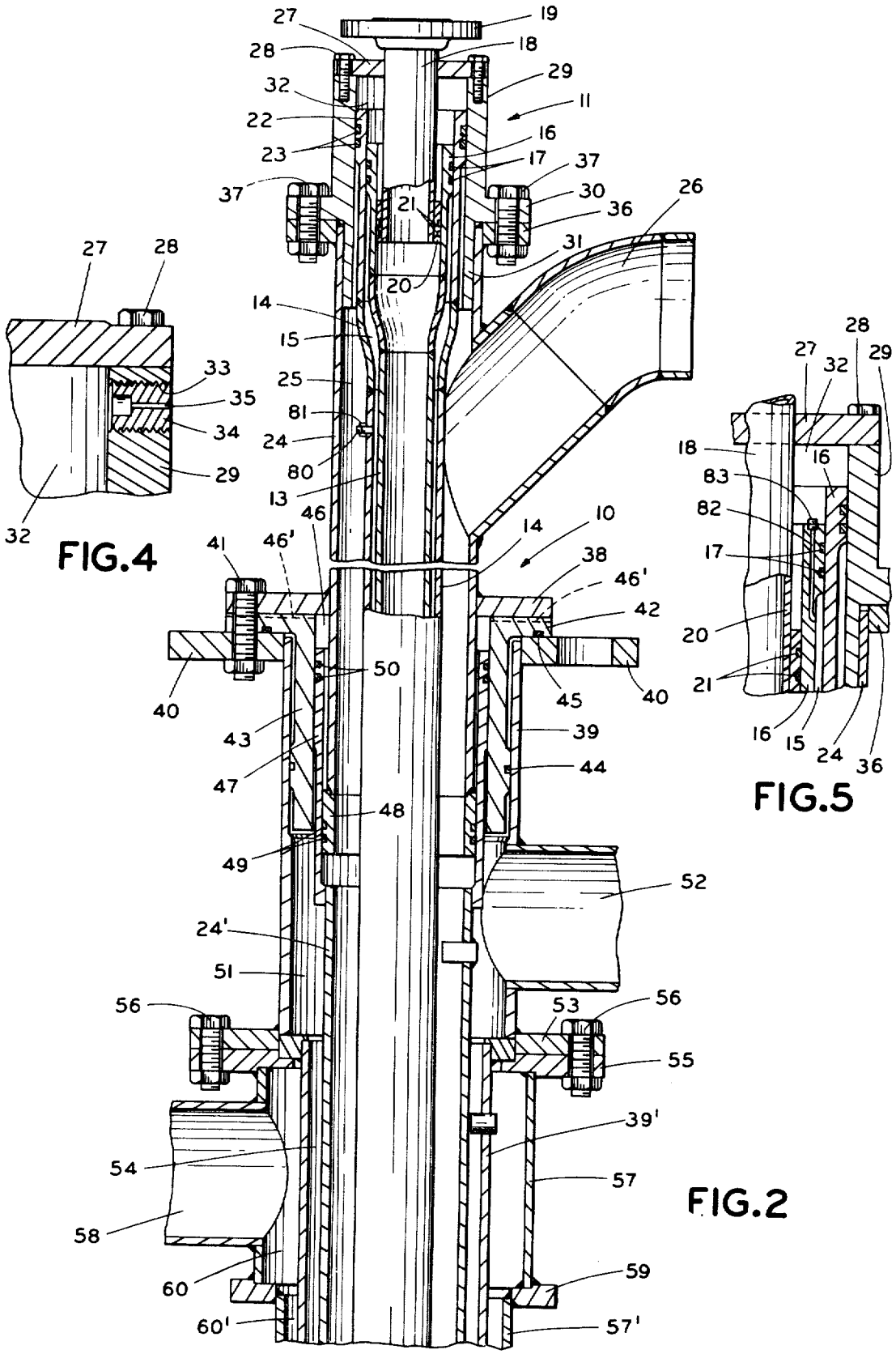
FIG. 2 is a cross sectional view disclosing a top adapter assembly of the injection lance shown in FIG. 1.
FIG. 4 is a detail view in cross section taken substantially along the line 4—4 of FIG. 1.
FIG. 5 is a detail cross sectional view through the uppermost part of an adaptor assembly showing a modified detail of the invention.

A third pipe is indicated at 24 and is provided with an extension or lower section 24', the connection therebetween which will be later described. The third pipe 24 has connected thereto an oxygen inlet connection 26 which provides for the flow of oxygen through an oxygen passage 25 provided between the pipe 24 and the pipe 14. As best shown in the upper portions of FIGS. 1 and 2, a cover plate 27 is removably connected by means of cap screws 28 to the upper ends of a sleeve or bushing 29. For the purposes of terminology, the piston sleeves 16 may be simply referred to as sleeves, as well as the bushing 29, since they are of sleeve-like construction and are all connected to respective pipes. The sleeve 29 is provided with a circumferential flange 30 and has also connected thereto a reduced portion 31 which is in overlapping engagement with the upper end of the third pipe 24. Since the upper terminal ends of the enlarged sleeves 16 and 22 are disposed below or in spaced relation with respect to the cover plate 27, there is provided a space or chamber 32. The upper portions of the bushing 29 are provided with a pair of threaded bores 33, only one of which is shown in FIG. 4, the said bores 33 having contained therein threaded plugs 34 which each include a vent bore 35 adapted to vent the chamber 32 to the atmosphere. A circumferential flange 36 is connected to the flange 30 by means of bolt and nut assemblies 37. A circumferential flange 38 is connected to the third pipe 24 and a fourth pipe 39 is provided with a flange 40 suitably connected to the flange 38 by means of bolt and nut assemblies 41. A flange 42 is sandwiched between flanges 38 and 40, the said flange 42 being provided on a bushing or sleeve 43 which is provided with a circumferential seal 44 in sealing engagement with respect to the fourth pipe 39. The flange 42 is sealed against the flange 40 by means of a circumferential seal 45. A vent space or chamber 46 is provided between the pipe 24 and the bushing 43, the same being vented to the atmosphere by virtue of a pair of vent openings 46'. As shown in FIG. 2, the third pipe 24 consists of two sections and the section 24' is provided with an upwardly extending sleeve 47 which is in sliding engagement with a piston sleeve 48 connected to the lower end of the third pipe 24. Suitable seals 49 on the piston sleeve 48 are in sealing engagement with an inner surface of the sleeve 47 and similarly, seals 50 on the sleeve 47 are in sealing relation with respect to the cylindrical surface of the bushing or sleeve 43.

The third pipe section 24' and fourth pipe extension section 39' provide a water directing space 51 which communicates with the water inlet 52. A flange 53 is connected to the lower end of the section 39 and the extension 39' of the pipe 39 provides a passage 54 in communication with the water circulating space 51. A flange 55 is connected to a fifth pipe 57 and suitable bolt and nut connections 56 connect flanges 53 and 55. The lower portions of the fifth pipe 57 are connected by means of a flange 59 to which is connected a downwardly projecting pipe extension 57' providing for a continuation of the pipe 57. The fifth pipe 57 provides for a water outlet space 60 which is fed by means of a water circulating space 60' formed by the fifth pipe extension 57' thereby circulating water outwardly through the discharge pipe 58.

Figure 3:
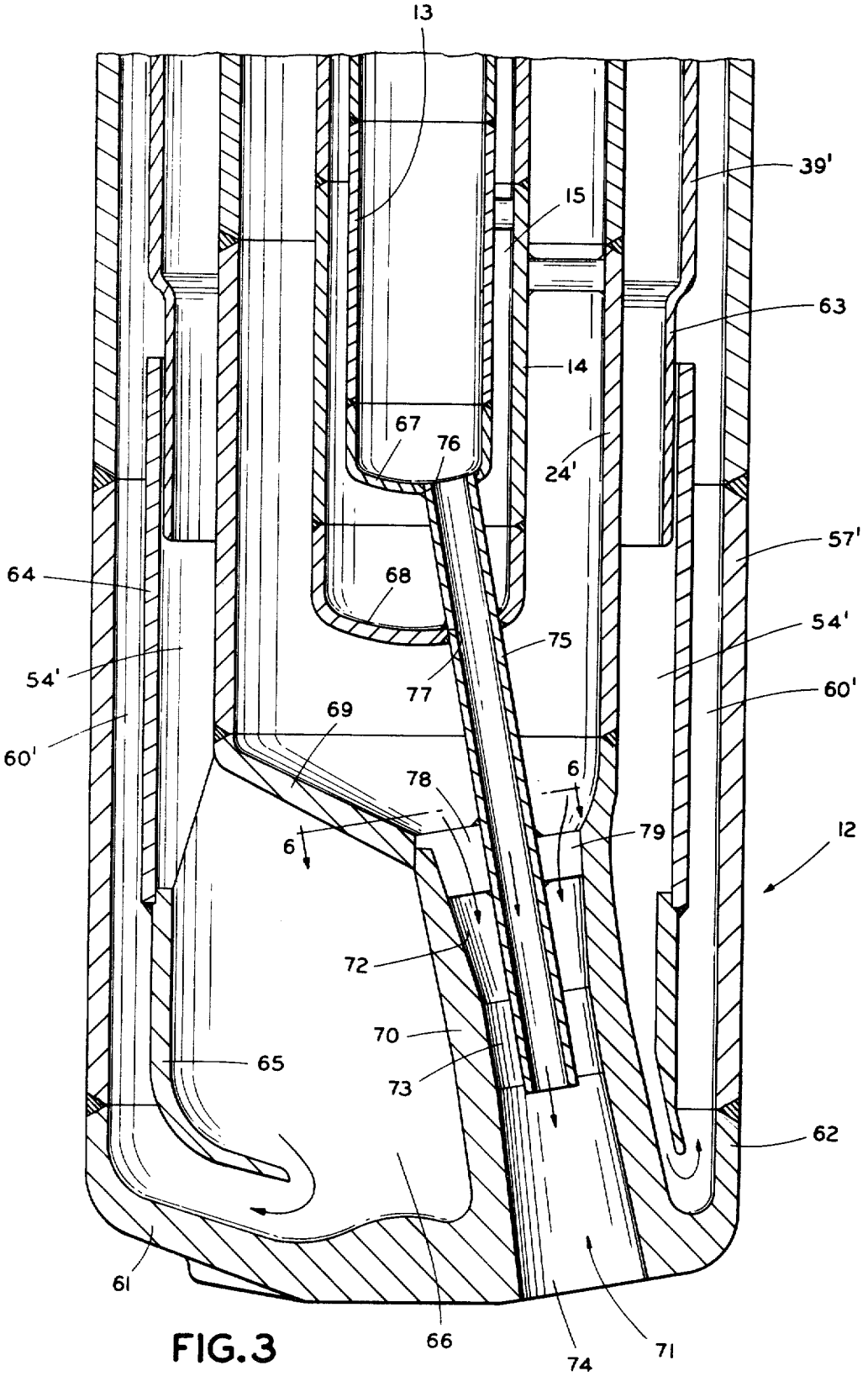
FIG. 3 is a cross sectional view through the lower portion or nozzle end of a gas injection lance.

Referring now particularly to FIG. 3, the lower or nozzle end 12 of the lance will be described. The fifth pipe extension 57' extends downwardly and is suitably connected by welding to a dish-shaped lower or transverse wall 61 having upwardly extending peripheral edge portions 62 conforming and being connected to the pipe extension 57'. The pipe extension 57' may consist of suitable similar extensions connected together by welding, these additional extensions not being designated separately but being considered part of the fifth pipe arrangement. The same is true for the other pipes in that the extensions are provided and are necessary to form slip joints accommodating the longitudinal expansion and contraction to which these assemblies are subjected by extreme temperatures. The pipe extension 39', for instance, is provided with a reduced portion 63 which is in relative sliding and mating relation with a pipe extension 64 which still is considered an extension of the pipes 39 and 39'. This type of arrangement accommodates the contractions and expansions which occur. The extension 64 is provided at its lower end with a skirt 65 defining a portion of an enlarged cooling chamber 66.

The present nozzle arrangement is of the multiple orifice type, meaning that in this case three orifices are utilized. FIG. 3 discloses only one such orifice since they are identical and are equally spaced about the circumference of the nozzle arrangement 12. The dish-shaped lower wall 61 which encloses the lower end of the nozzle can be described as transverse in that it extends across the lower end of the pipe section 57'. Similarly, an arcuate but nevertheless somewhat transverse closure wall 67 encloses the lower end of the first inner pipe 13. Similarly, the insulating pipe 14 is enclosed by a transverse or generally arcuate closure wall 68. A similarly extending wall 69 encloses the oxygen space which is provided between the pipes 14 and 24'. Three cylindrical walls 70 are provided in the lower end of the nozzle arrangement 12, only one of which is shown. The cylindrical walls 70 are cooled by means of the water circulating within the chamber 66. The lower ends of each of the cylindrical walls 70 are provided with an outlet orifice 71 through which the combined fuel and oxygen flows into the oxygen vessel of a BOF operation. Each orifice 71 is of converging diverging type in that a cylindrical diverging wall portion 74 is provided at the upper end of the orifice 71 and communicates with a cylindrical portion 73 of constant diameter throughout its length, the said cylindrical portion 73 then communicating with the diverging cylindrical portion 74 extending to the end of the nozzle tip. Each of the orifices 74 is provided with a fuel tube 75 welded within an opening 76 in the closure wall 67. Each fuel tube 75 extends through an opening 77 provided in the transverse closure walls 68 to which it is also welded. The fuel tube 75 is thus supported in cantilever relation relative to the tube 13 and 14 and projects centrally into the nozzle 71 terminating slightly below the terminal end of the constant cylindrical wall portion 73. The tube 75 is also supported as best shown in FIGS. 3 and 6 by means of spacers 78 and 79 in turn rigidly welded to the cylindrical converging wall portion 72'. Each tube 75 thus is effectively supported within each orifice 71, yet permitting the free flow of oxygen and fuel through the ends of each orifice.

Referring now to FIG. 2 and particularly to the portion of the insulating pipe 14 below its piston sleeve 22, there is provided a threaded test opening 80 which is normally closed by means of a threaded plug 81. Similarly, referring now to the modifcation of FIG. 5, the parts are identical except that the piston sleeve 16 forming part of the first pipe 13 is provided with one or more passages 82 which communicate at their lower ends with the insulating space 15, the said passage 82 being normally closed at its upper end by means of a threaded plug 83.

THE OPERATION

In the operation of the lance, it is supported at its upper end by means of a suitable crane type structure above a bath provided in a basic oxygen furnace. The nozzle is disposed a predetermined distance from the bath and fuel oil may enter through the stub pipe 18, whereupon it flows to the ends thereof and out through the tubes 75 where it is mixed in the orifices 71. Oxygen, of course, is supplied through the oxygen pipe 26 downwardly through the passage 25 through the converging cylindrical portion 70 through and outwardly through the portion 74. Water is circulating through the inlet 52 downwardly through the spaces 51 and 54 to the lower end of the nozzle tip whereupon it is circulated around the cylindrical wall 72 in the chamber 66, then flows outwardly through water circulating space 60' upwardly into the space 60 and outwardly through the water outlet 58.

One of the primary features of the invention is the easily repairable feature and also the ease with which the sealing surfaces and seals may be inspected. When the removable bushing 29 is removed by removal of the bolts 37, the seals 23 may be immediately inspected and replaced. Further, by the removal of the stub pipe 18, the seals 21 may be either inspected or replaced.

As indicated in the above referenced Berry patent, the vent chamber is extremely important in venting any leaking oxygen to the atmosphere before it can be intermixed with other elements which might be leaking. In other words, oxygen which may leak past the seals 23 immediately is vented to the atmosphere through the vent openings 35. The threaded bores 33 also serve the purpose of permitting the insertion of a test nipple replacing the one-half inch plug which is shown in FIG. 4. A test nipple may be a portion of a pressure testing unit which provides high pressure fluid into the vent chamber 32 for the purpose of testing the seals 23 and 21.

The insulating pipe 14 provides an insulating space 15 which serves as a safety chamber between the oxygen passage 25 in the event that there is a leakage of any of the connections of the pipe 13. As indicated previously, the pipes may all be made in sections which are welded together and any leakage such as could occur because of an improper weld in the fuel tube 13 will be taken care of because of the insulating space 15. The seal 17 prevents the escape of fuel oil from the insulating chamber, but in the event some does escape by the seals 17, the same is carried from the vent chamber 32 through the vent openings and is quickly noticed the operator so that the operation may be halted for repair.

The threaded test opening 80 and pipe plug arrangement 81 also serve a distinct and effective purpose during the testing procedure of the lance. In order to properly test the welds and the seals 17 upon partial disassembly of the upper end of the arrangement, a suitable nipple is attached to the threaded opening 18 to direct water under pressure into the insulating chamber 15 thereby providing for the desired test of the seals 17 and the welds of the various sections of the pipes involved. It is apparent that in view of the arrangement of the sleeves 16, 22 and bushing 29 with their respective seals, vertical expansion and contraction of the pipes is accommodated. Expansion of the pipe 39 and section 39' is accommodated as shown in FIG. 3 by the sliding slip joint or reduced section 63 relative to the pipe extension 64.

FIG. 5 shows a modified arrangement. In this case the sleeve 16 is provided with one or more vertical passages 82 which communicates with the insulating chamber 15. In the pressure tests of the seals 17 the passages 82 would be closed by the pipe plug 83. Thus, the seals 17 would be effectively tested. However, it is contemplated that the seals 17 could be eliminated or the passage 82 could remain open so as to permit any leakage from the chamber 15 to be immediately directed into the chamber 32 where it would become quickly visible to the operator. Thus, the alternate is provided in that during operation where the seals 17 are employed the operator may remove the pipe plug 83, opening the bore 82 to accommodate the free flow of escaping fuel oil into the vent chamber 32, whereupon it would be quickly noticed due to leakage outwardly of the vent openings. In this type of modification the O-rings or seals 17 would be primarily utilized in the pressure testing of the unit, but would not have any effect during the normal operation of the lance, since the passages 82 would be open.

A further advantage is the provision of the venting chamber 46 and the vent opening 46'. Thus, any leakage of oxygen past the seals 49 would immediately appear in the chamber 46 and be dissipated through the openings 46'. The advantages of the quickly removable disconnect of the bushing 43 is also apparent, the same permitting quick inspection of the seals and proper replacement of any portions of this particular assembly. Thus, it is also apparent that the arrangement permits pressure testing of the lance prior to its use which is not accomplished or contemplated in the prior art.

Referring now particularly to the nozzle structure disclosed, the tubes 75 are effectively cantilevered on the lower ends of the pipes 13 and 14, and thus an effective operation is secured.

The cantilever arrangement of the tubes 75 provides for a strong anchoring of said tubes. Further, the spacers 78 and 79 further support the tubes 75 in the orifices 71 effectively and thereby eliminate the tendency of vibration which would otherwise occur. Yet the passage of oxygen through the orifices is facilitated and mixture of oxygen and oil is achieved in the diverging position of the orifice thereby effectively mixing and discharging the combination.

What is claimed is:

1. For a lance adapted for mixing oxygen and fuel and including, a first central fuel pipe, a second pipe concentric with said first pipe and providing an insulating space around said fuel pipe, a third pipe concentric with and providing an oxygen conveying space around said second pipe, fourth and fifth pipes concentric with each other and said other pipes providing concentric coolant circulating spaces;

a nozzle head, a first lower closure wall connected at its peripheral edge to said fifth pipe, at least one cylindrical passage means opening outwardly of said first closure wall to provide an oxygen and fuel discharge orifice, an extension of said fourth pipe providing at a lower portion of said nozzle head a coolant chamber surrounding said cylindrical passage and communicating with said coolant circulating spaces, a second closure wall on said third pipe above said first closure wall, a third closure wall on said second pipe enclosing said insulating space and being disposed above said second closure wall, a fourth closure wall on said first pipe disposed above said third closure wall, and a tube connected to said fourth closure wall and communicating with said first fuel pipe, said tube being connected to and extending through said third closure wall, and said tube having a discharge end [terminating] within said cylindrical passage. [in spaced relation relative to said oxygen and fuel discharge orifice]

2. The invention in accordance with claim 1, said closure walls extending transversely to the axis of said lance.

3. The invention in accordance with claim 1, wherein said tube is supported on said third and fourth closure walls in cantilever relation.

4. The invention in accordance with claim 3, said discharge orifice having a cylindrical wall portion converging inwardly and then outwardly toward said first closure wall.

5. The invention in accordance with claim 4, said cylindrical wall having a portion thereof disposed between said converging diverging portion of constant cross sectional diameter.

6. The invention in accordance with claim 5, the discharge end of said tube terminating outwardly relative to said portion of constant cross section.

7. The invention is accordance with claim 3, including supporting means for supporting an intermediate portion of said tube on said third pipe.

8. The invention in accordance with claim 7, said supporting means including circumferentially spaced space elements supported in said orifice adjacent to said coolant chamber.

* * * * *